Nov. 20, 1928.
M. J. WILSON
BUMPER
Filed Aug. 26, 1927
1,692,482
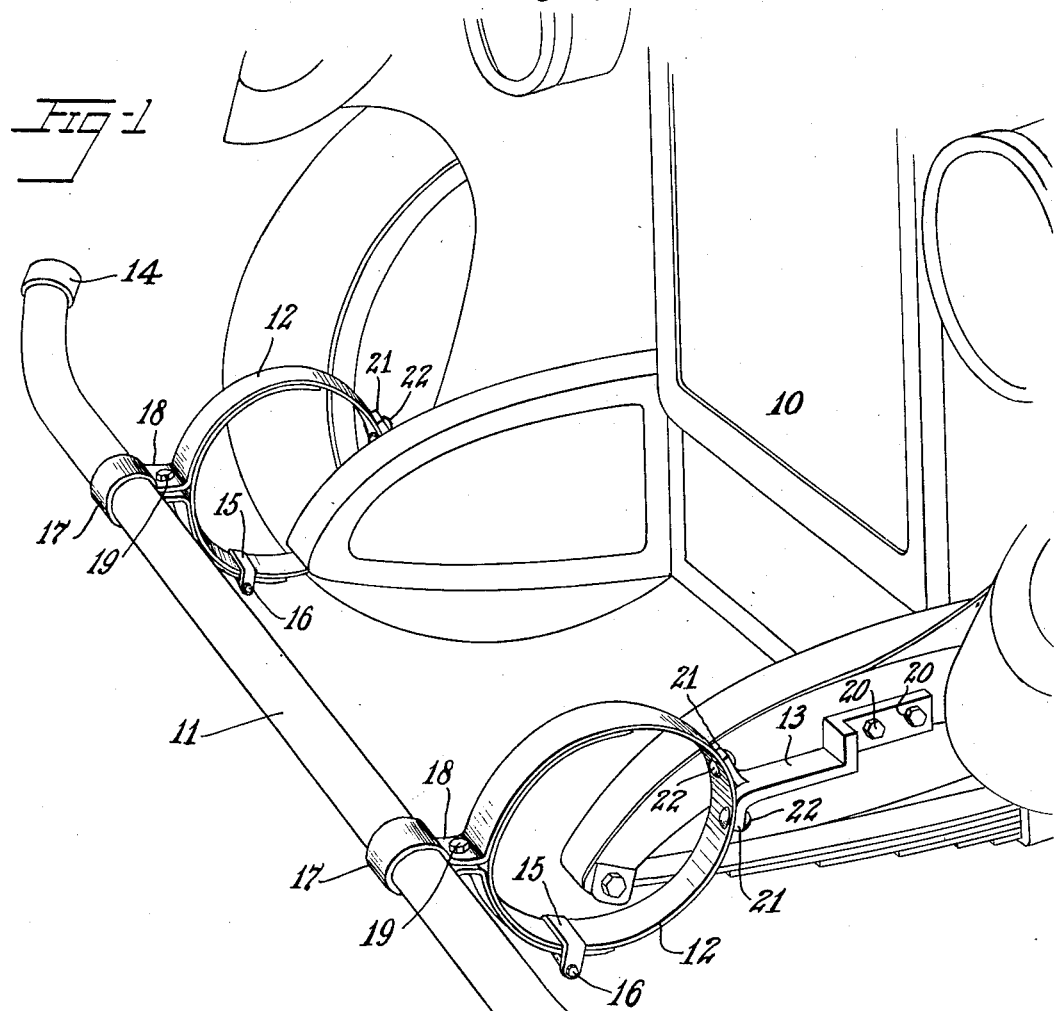
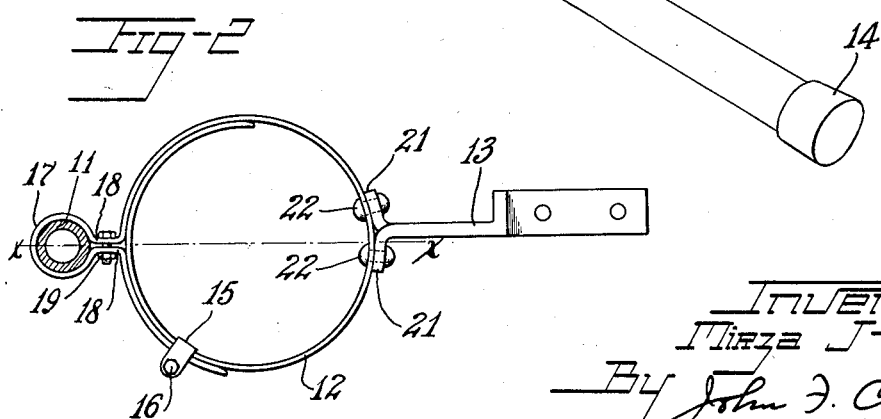
Inventor
Mirza J. Wilson
By John F. Cherry
Atty.

Patented Nov. 20, 1928.

1,692,482

UNITED STATES PATENT OFFICE.

MIRZA J. WILSON, OF KENMORE, OHIO.

BUMPER.

Application filed August 26, 1927. Serial No. 215,654.

This invention relates to bumpers, and more particularly to bumpers for motor vehicles wherein the bumper attached to the front or rear end, or both, of the vehicle will absorb or cushion substantially all shocks occasioned by impact against an object, without damage to the bumper or vehicle.

It is the chief objects of this invention to provide a vehicle bumper which will be simple in construction, effective in operation, adapted for use with various makes of vehicles, and requires no upkeep after installation.

Of the accompanying drawings:

Fig. 1 is a perspective view of the front end of a motor vehicle, and a bumper embodying my invention in its preferred form attached thereto.

Fig. 2 is a side elevation of the bumper with a part thereof in section.

Referring to Fig. 1 of the drawing, 10 is a motor vehicle of known construction to which the bumper is secured, said bumper generally comprising a buffer-bar 11, a pair of spaced apart yielding members 12, 12 supporting the same, and respective brackets 13, 13 secured to said yielding members and to the opposite sides of the vehicle frame for securing the bumper structure to the latter. The buffer bar 11 may be of any suitable construction being herein shown as a rigid tubular structure having its end portions bent rearwardly and provided with end-caps 14, 14.

Each of the yielding members 12, which carry the buffer-bar 11, preferably comprises a single strip of resilient material such as tempered steel, said strip being bent to generally circular shape with its end portions overlapping each other, the overlying end portion being held against the underlying end portion by means of a U-shaped clamp 15 having apertured ears through which passes a retaining bolt 16, said clamp and bolt being adapted to hold the structure in circular formation while permitting sliding movement of the respective end portions with relation to each other in a curvilinear path.

The overlying end portion of each yielding member 12 is formed with an integral, outwardly extending loop or collar 17 connected with the body of the structure by parallel portions 18, 18, and the loops 17 of the respective yielding members 12 accommodate the buffer-bar 11 which is clamped therein by nut and bolt connections 19, 19 passing through the respective parallel portions 18. As shown, the position of each loop 17 in the overlying end portion of the resilient member is substantially in the middle of the zone where the end portions of said member are overlapped.

Each of the mounting-brackets 13 comprises a unitary structure having a rear portion disposed in a vertical plane and apertured to receive bolts 20, 20 by which it is secured to the vehicle frame, its forward portion being bent so as to lie in a horizontal plane and having its free end bifurcated and the parts thereof 21, 21 bent in opposite directions and apertured to receive rivets 22, 22 or the like by which the bracket 13 and the yielding member 12 are secured to each other.

As is clearly shown in Fig. 2, the bracket 13 is not secured to the yielding member 12 at a point diametrically opposite the buffer-bar 17, indicated by the broken line X—X, but is offset to one side thereof, being therein shown as above the line X—X although permissibly it may be below said line.

The operation of the bumper will best be understood by considering that each yielding member 12 constitutes, in effect, a pair of overlapping leaf springs, the effective length of each leaf being the distance from its point of attachment with the bracket 13 to its intersection with the diametric line X—X adjacent the buffer-bar 17, where the force of any impact is received. Since the bracket 13 and yielding member 12 are attached at a point which is offset from the diametric line X—X, it will be seen that one of the leaves of the yielding member is longer than the other, and therefore will be the first to flex under impact because of the greater leverage. This results in relative movement of the two leaves, which because of the arrangement of the same, describes a curvilinear path. Thus dead center which might cause the leaves to buckle is avoided.

My invention may be variously modified within the scope of the appended claims.

I claim:

1. In a bumper, the combination of a buffer-bar, and a pair of yielding, generally circular members each formed with an integral loop encircling said buffer-bar for supporting the same.

2. A bumper as defined in claim 1 and including means for securing said yielding members to a vehicle frame.

3. In a bumper, the combination of a buffer-bar, and a yielding member supporting the same, said yielding member comprising arcuate spring leaves having overlapping freely movable end portions.

4. A bumper as defined in claim 3 in which said spring leaves comprise the respective end portions of a single strip of material of generally circular formation.

5. In a bumper, the combination of a buffer-bar, a pair of yielding members each comprising a single strip of spring material arranged in generally circular formation with overlapping end portions, one of the latter including an integral loop in which the buffer-bar is mounted, and means for securing said yielding members to a vehicle frame.

6. In a bumper, the combination of a buffer-bar, a pair of yielding supports therefor, each of said supports embodying arcuate overlapping spring leaves, clamping means engaging said spring leaves for holding them together while permitting relative curvilinear longitudinal movement thereof, and means for securing said yielding supports to a vehicle frame.

7. A bumper as defined in claim 6 in which the spring leaves comprise the end portions of a unitary, generally circular strip of material.

8. In a bumper, the combination of a buffer-bar, a yielding support therefor embodying a pair of arcuate, overlapping spring leaves having different effective lengths, and means for attaching said yielding support to a vehicle frame.

9. A bumper as defined in claim 8 in which the spring leaves comprise the end portions of a single, generally circular strip of material, and having their different effective lengths determined by the position of the attaching means with relation to the buffer-bar.

10. In a bumper, the combination of a buffer-bar, a pair of yielding generally circular members supporting said bar, said yielding members being axially aligned on an axis parallel to said bar, and means for attaching said yielding members to a vehicle frame, said attaching means being secured to said yielding means elsewhere than diametrically opposite said buffer-bar.

11. In a bumper, the combination of a buffer-bar, yielding, generally circular members supporting said bar at spaced positions, and means for attaching said yielding members to a vehicle frame, said attaching means comprising respective brackets each having one bifurcated end, the parts of which are spread in opposite directions and secured to the yielding member at circumferentially spaced points.

In witness whereof I have hereunto set my hand this 19th day of Aug., 1927.

MIRZA J. WILSON.